(12) United States Patent
Yin et al.

(10) Patent No.: US 7,948,714 B2
(45) Date of Patent: May 24, 2011

(54) TRANSDUCER INCLUDING AN ELEMENT OF A TRANSDUCER AND A SIDEWALL IN AN ELECTRICALLY CONDUCTIVE MAGNETIC LAYER

(75) Inventors: Huaqing Yin, Eden Prairie, MN (US); David Chris Seets, Shorewood, MN (US); Thu Van Nguyen, Shakopee, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 463 days.

(21) Appl. No.: 11/344,398

(22) Filed: Jan. 31, 2006

(65) Prior Publication Data

US 2007/0177300 A1    Aug. 2, 2007

(51) Int. Cl.
G11B 5/60    (2006.01)
(52) U.S. Cl. .................... 360/236.5; 360/123.1
(58) Field of Classification Search ............ 360/119.01, 360/119.03, 119.07, 123.04, 123.07–123.08, 360/123.1, 123.16, 123.2, 123.21, 123.36, 360/123.41–123.42, 123.57, 125.1, 125.36, 360/126, 234.3–234.6, 236.5
See application file for complete search history.

(56) References Cited

U.S. PATENT DOCUMENTS

| | | | | |
|---|---|---|---|---|
| 4,949,209 A * | 8/1990 | Imanaka et al. | ........... | 360/125.5 |
| 5,286,674 A * | 2/1994 | Roth et al. | ...................... | 438/624 |
| 5,748,417 A * | 5/1998 | Malhotra et al. | ........... | 360/125.34 |
| 5,820,770 A | 10/1998 | Cohen et al. | ...................... | 216/22 |
| 5,995,342 A * | 11/1999 | Cohen et al. | ............. | 360/125.35 |
| 5,997,381 A * | 12/1999 | Dee et al. | ........................... | 451/5 |
| 6,195,871 B1 * | 3/2001 | Watanuki | ................... | 29/603.09 |
| 6,256,170 B1 * | 7/2001 | Honda | ........................ | 360/234.5 |
| 6,661,605 B1 | 12/2003 | Pust et al. | .................... | 360/126 |
| 6,747,846 B2 * | 6/2004 | Kato et al. | ................ | 360/234.5 |
| 6,813,118 B2 | 11/2004 | Pust et al. | .................. | 360/234.5 |
| 6,950,280 B2 | 9/2005 | Rea et al. | ...................... | 360/126 |
| 7,027,264 B1 * | 4/2006 | Subrahmanyam et al. | | 360/234.5 |
| 7,042,683 B1 * | 5/2006 | Cross et al. | ................... | 360/319 |
| 7,113,369 B2 * | 9/2006 | Ota et al. | ................... | 360/234.5 |
| 7,193,817 B2 * | 3/2007 | Lille | ............................. | 360/128 |
| 2002/0102779 A1 | 8/2002 | Yang | ............................. | 438/199 |
| 2002/0122276 A1 * | 9/2002 | Onodera | .................... | 360/234.5 |
| 2003/0128469 A1 * | 7/2003 | Pust et al. | ................... | 360/234.5 |
| 2003/0161069 A1 | 8/2003 | Hipwell, Jr. et al. | ........ | 360/234.5 |
| 2004/0110365 A1 | 6/2004 | Su et al. | ........................ | 438/612 |
| 2004/0246623 A1 * | 12/2004 | Yazawa | ........................ | 360/234.5 |
| 2004/0257706 A1 * | 12/2004 | Ota et al. | ................... | 360/234.5 |
| 2005/0036238 A1 | 2/2005 | Tabakovic et al. | ......... | 360/234.5 |
| 2005/0067372 A1 | 3/2005 | Li et al. | ............................ | 216/22 |
| 2005/0067374 A1 | 3/2005 | Baer et al. | ........................ | 216/22 |
| 2005/0190495 A1 * | 9/2005 | Lille | ............................. | 360/128 |
| 2005/0219764 A1 | 10/2005 | Kameda et al. | ............... | 360/313 |

* cited by examiner

*Primary Examiner* — Craig A. Renner
*Assistant Examiner* — Carlos E Garcia
(74) *Attorney, Agent, or Firm* — David C. Bohn; Westman, Champlin & Kelly, P.A.

(57) ABSTRACT

A transducer includes a first layer that is selectively deposited in a contact region to form a core, and selectively deposited in a transducer region to form a first element of the transducer. The transducer includes an electrically conductive magnetic deposit. The electrically conductive magnetic deposit forms a sidewall on the core. The electrically conductive magnetic deposit forms a second element of the transducer in the transducer region. The second element of the transducer has a planarized surface that is coplanar with a planarized surface of the sidewall.

20 Claims, 5 Drawing Sheets

TRANSDUCER INCLUDING AN ELEMENT OF A TRANSDUCER AND A SIDEWALL IN AN ELECTRICALLY CONDUCTIVE MAGNETIC LAYER

FIELD OF THE INVENTION

The present invention relates generally to transducer devices that include an electrically conductive magnetic layer, and more particularly but not by limitation to read/write heads that include an electrically conductive magnetic layer.

BACKGROUND OF THE INVENTION

Read/write heads are typically formed in multiple thin film layers that are deposited on a slider substrate. The transducer connects electrically to an external circuit via contact pads. The contact pads are electrically connected to read and write transducers in the read/write head by way of traces in conductive layers and vias that pass through insulating layers. Providing a via through an insulating layer requires multiple process steps that are expensive and time consuming, and increase the possibility of a complete batch of read/write heads being scrapped due to an error in one of the process steps that are added to produce the via.

A method and device are needed in which additional process steps needed to form a via are reduced. Embodiments of the present invention provide solutions to these and other problems, and offer other advantages over the prior art.

SUMMARY OF THE INVENTION

Disclosed are transducers and methods of making transducers. The transducer comprises a first layer. The first layer is selectively deposited in a contact region to form a core. The first layer is selectively deposited in a transducer region to form a first element of the transducer.

The transducer comprises an electrically conductive magnetic deposit. The electrically conductive magnetic deposit forms a sidewall on the core. The electrically conductive magnetic deposit forms a second element of the transducer in the transducer region. The second element of the transducer has a planarized surface that is coplanar with a planarized surface of the sidewall.

Other features and benefits that characterize embodiments of the present invention will be apparent upon reading the following detailed description and review of the associated drawings.

BRIEF DESCRIPTION OF THE DRAWINGS

FIGS. 2-6 illustrate exemplary processes and structures that can be used in order to provide sidewall conduction through an electrically conductive magnetic layer. The process and structures are useful for magnetic data transducers, magnetooptic data transducers as well as other transducers that include a conductive magnetic layer. The term "core" as used in this application refers to a support core, as shown for example in. FIGS. 2-7, 9-14, and does not refer to a magnetic core.

FIG. 9 illustrates a cross-sectional view of a read/write head that includes a planarized sidewall on a core and a planarized element of a transducer that are portions of a deposit of an electrically conductive magnetic layer in the read/write head.

FIGS. 10-14 illustrate cross-sectional view of cores and cylindrical sidewalls.

DETAILED DESCRIPTION OF ILLUSTRATIVE EMBODIMENTS

In the embodiments described below, a transducer is disclosed that includes an element of the transducer that is formed by deposition of an electrically conductive magnetic layer. The deposition step that is used to form the element of the transducer is also used to form a sidewall on a insulating core. The sidewall functions as a via and provides a feedthrough that is formed in an electrically conductive magnetic layer. Transducer signals are conducted between a transducer and contact pads by the core and associated circuit traces formed in conductive layers. A reliable feedthrough is provided with a simplified manufacturing process that reduces the process steps needed to produce the transducer. The process is especially beneficial in manufacturing read/write heads where there are a large number of feedthroughs needs in a restricted space.

Figure 1:
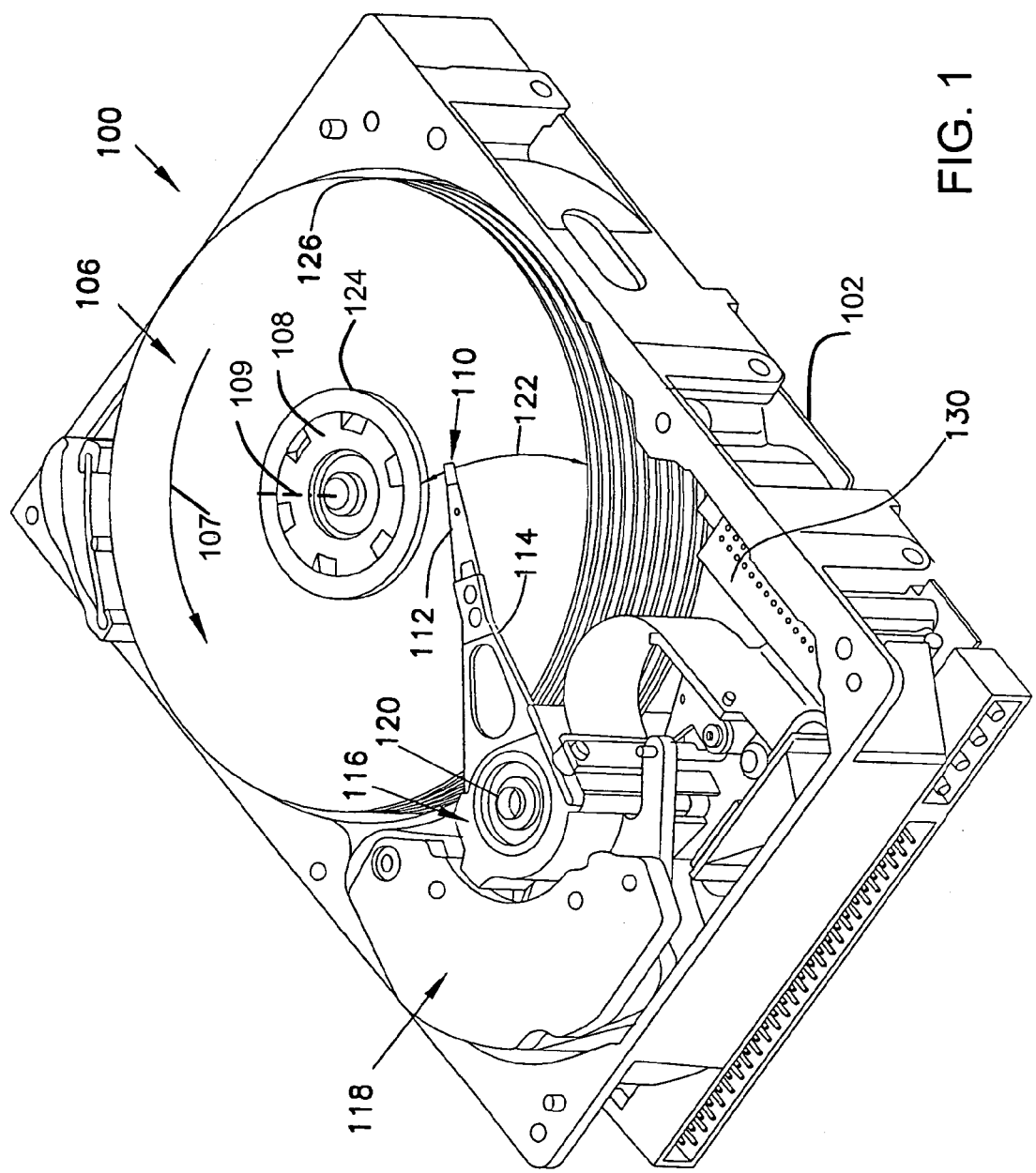
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

FIGS. 2-6 illustrate exemplary processes and structures that can be used in order to provide sidewall conduction through an electrically conductive magnetic layer. The process and structures are useful for magnetic data transducer, magnetooptic data transducers as well as other transducers that include a conductive magnetic layer.

Figure 2:
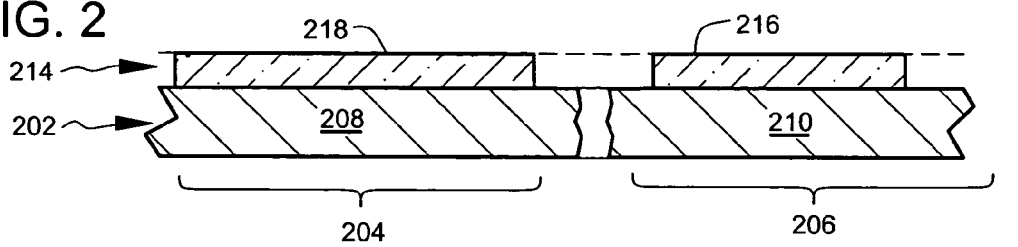

FIG. 2 illustrates a conductive layer 202 which is selectively deposited over an underlying substrate (not illustrated). The conductive layer 202 extends over portions of a transducer region 204 and a contact region 206. Using a selective deposition process such as photolithography, a first portion 208 of the conductive layer 202 in the transducer region 204 is not contiguous with a contact portion 210 of the conductive layer 202 in the contact region 206. The contact portion 210 is thus electrically isolated from the first portion 208, and the contact portion 210 can be used to carry a transducer signal without interfering with functioning of the first portion 208 in a magnetic transducer.

A first layer 214 is deposited adjacent the conductive layer 202. The first layer 214 is selectively deposited to form separate portions that are not contiguous with one another. The first layer 214 includes a core 216 in the contact region 206. The core 216 preferably has a shape of a cylinder and has a distal end that protrudes.

The first layer 214 also includes a first element of the transducer 218 in the transducer region 204. The first element of the transducer 218 preferably comprises a spacer layer in a magnetic transducer formed in the transducer region 204. The first layer 214 is preferably formed of silicon carbide, alumina, silicon dioxide or silicon nitride. Other electrically insulating materials used in magnetic transducers can also be used in the first layer 214.

Figure 3:
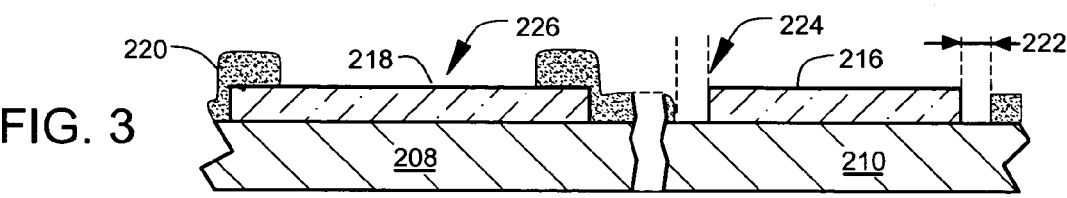

FIG. 3 illustrates application of a mask 220. The mask 220 is patterned using lithographic techniques to cover some portions of layers 202, 214, and to leave other portions of layers 202, 214 uncovered. The mask 220 has an opening 224 that surrounds the core 216. There is a space 222 between the mask 220 and the core 216, such that a portion of the contact portion 210 is exposed inside the mask 220 that surrounds the core 216. There is also a mask opening 226 in the transducer region 204. When the application of the mask 220 is complete, the mask opening 226 in the sensor region 204 defines a location for deposition of a second element of the transducer (not shown in FIG. 3). When the application of the mask 220 is complete, the opening 224 defines a location for deposition of a sidewall (not illustrated in FIG. 3) adjacent the core 216. The mask 220 preferably has a thickness that exceeds the expected thickness of the second element of the transducer.

Figure 4:
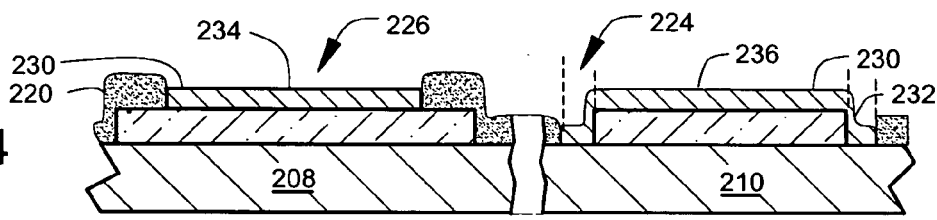

FIG. 4 illustrates depositing of an electrically conductive magnetic layer 230 through the openings 224, 226 in the mask 220. The electrically conductive magnetic layer 230 is deposited in the space 222 around the core 216 to form a sidewall 232 and a cap 236 on the core 216. The sidewall 232 provides an electrical conduction path between the contact portion 210 and subsequently deposited layers (not illustrated in FIG. 4). The sidewall 232 preferably conducts a transducer signal. The electrically conductive magnetic layer 230 is preferably a plated layer. The electrically conductive magnetic layer 230 can include an seed layer to facilitate plating. The electrically conductive magnetic layer 230 preferably comprises a soft, high permeability magnetic alloy that includes nickel and iron. The sidewall 230 comprises a cylindrical shape that forms an electrically conductive path adjacent the core 216. The sidewall can have other deposition features in addition to the cylindrical shape adjacent the core 216.

The electrically conductive magnetic layer 230 is deposited through the mask opening 226 to form a second element of the transducer 234. The second element of the transducer 234 provides a magnetic transducer element that is part of a transducer formed in the transducer region 204. The second element of the transducer 234 preferably comprises a magnetic return layer in a magnetic transducer.

Figure 5:
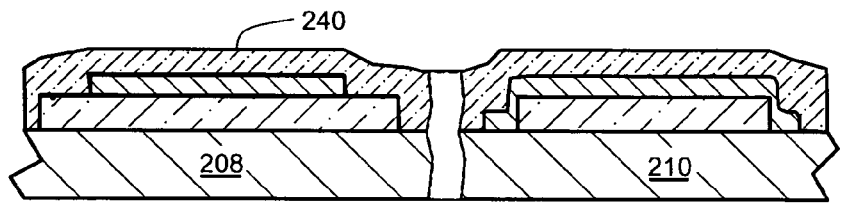

FIG. 5 illustrates application of a backfill layer 240 which backfills the sensor region 204, the contact region 206 and at least some intervening spaces between the sensor region 204 and the contact region 206. The backfill layer 240 comprises electrically insulating material, preferably alumina. The layer 240 fills gaps between the second element of the transducer 234 and the sidewall 232 and cap 236 in preparation for planarization in a subsequent step described below in connection with FIG. 6.

Figure 6:
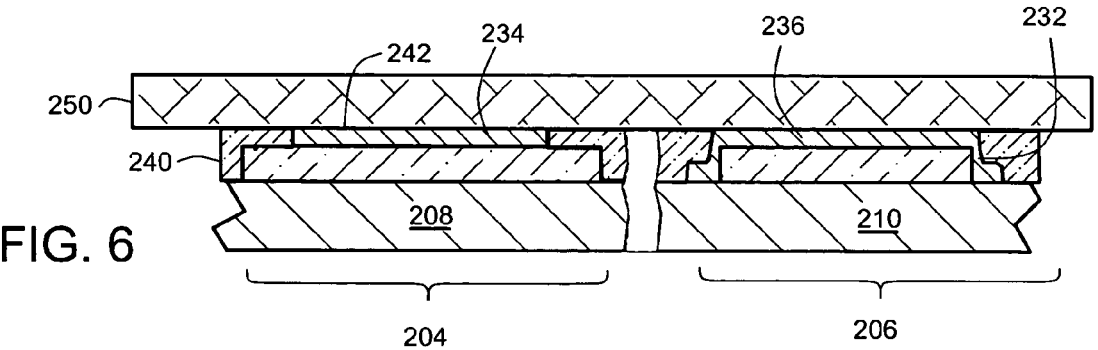

FIG. 6 illustrates planarizing the sidewall 232, the cap 236 and the second element of the transducer 234 using a preferred method of chemical mechanical polishing (CMP). Other known planarizing methods can also be used. A polishing tool 250 is brought simultaneously in contact with the sidewall 232, the cap 236, the second element of the transducer 234 and the backfill layer 240. The tool 250 moves relative to the upper sensor surface 242 and polishes until there is a planarized upper sensor surface 242 suitable for deposition of subsequent layers (not illustrated in FIG. 6).

After planarizing is complete, the tool 250 is removed and the upper sensor surface 242 is a planarized surface and is ready for deposition of additional sensor layers in the sensor region 204, and for deposition of additional contact layers in the contact region 206. The planarizing process, whether done by chemical mechanical polishing or other planarizing methods, exposes upper surfaces of the sidewall 232 and the cap 236 so that further metallic contact structures can be deposited. After planarization, the sidewall 232 protrudes to a level that is substantially the same as a level of protrusion of the second element of the transducer 242. The protrusions of the sidewall 232 and the second element of the transducer 242 have mutually coplanar planarized surfaces. The term "coplanar" means that surfaces lie in the same plane within the limits of the planarization process. When chemical mechanical polishing is used, the coplanar planarized surfaces comprise chemical mechanical polished surfaces.

Figure 7:
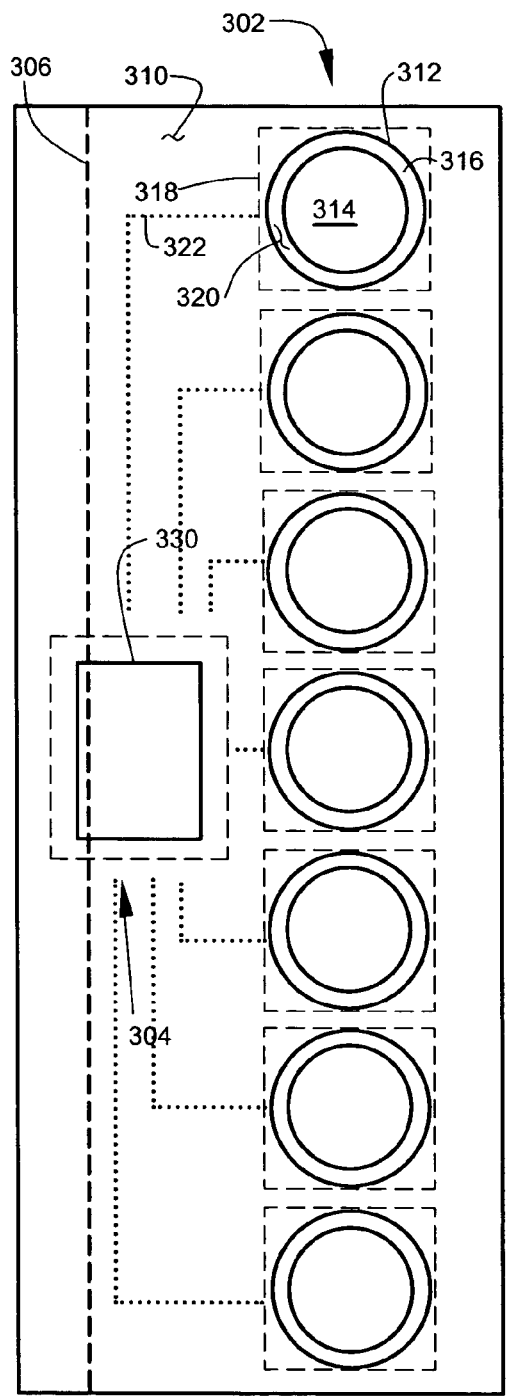
Figure 8:
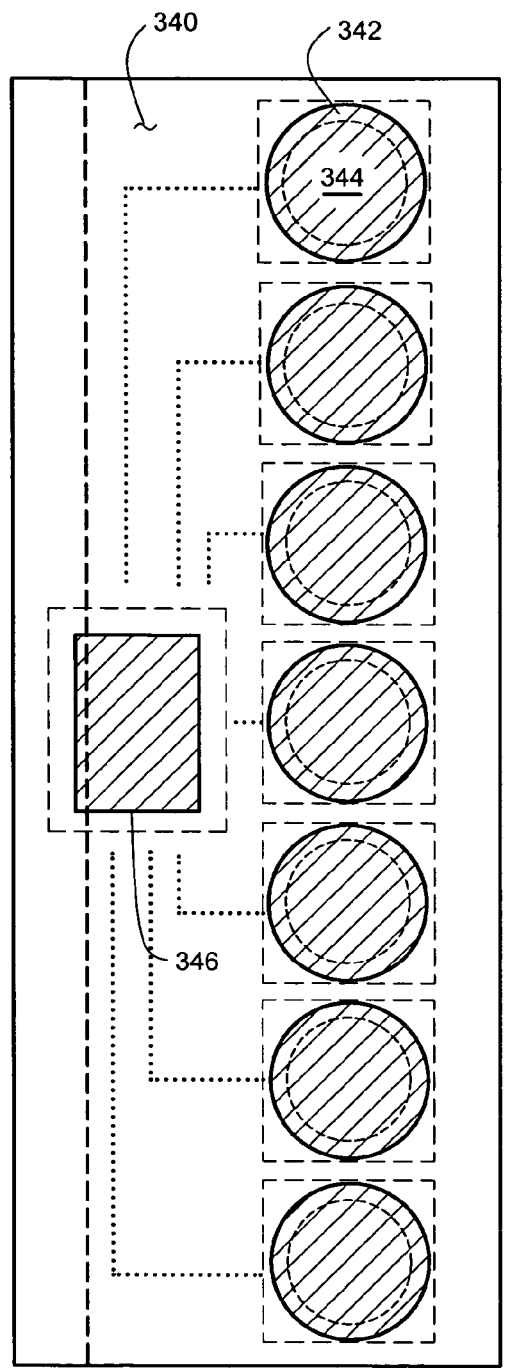

FIGS. 7-8 illustrate process steps in forming a transducer that comprises a read/write head that can be used in a data storage device such as a disc drive. The views shown in FIGS. 7-8 are plan views of a trailing side of the read/write head. The read/write head includes a contact region 302 and a transducer region 304. Subsequent to the process steps shown in FIGS. 7-8, the transducer is lapped to a lap line 306, exposing layers of the read/write head at a bottom side for communicating (reading and writing) data to a disc. The process step illustrated in plan view in FIG. 7 corresponds generally with the process step illustrated in cross-sectional view in FIG. 4. The process step illustrated in plan view in FIG. 8 corresponds generally with the process step illustrated in cross-sectional view in FIG. 6 (after removal of the tool 250 from FIG. 6).

In FIG. 7, a topmost layer comprises a mask 310 (corresponding with the mask 220 in FIG. 4). The mask 310 has an opening 312 that surrounds a core 314. There is a space 316 between the mask 310 and the core 314 such that a ring-shaped portion 320 of a contact portion 318 is exposed between the mask 310 and the core 314. The contact portion 318 connects to the transducer region by way of a trace 322 that is part of the same layer as the contact portion 318. As illustrated, the read/write head typically has multiple cores such as core 314 and multiple mask openings such as opening 312 which provide for multiple contacts in the contact region 302. The contacts are typically used for making electrical connections to transducer features such as a read head, a write head, electrical lap guides (ELG) and the like. One or more of such contacts can be made using the processes and structures disclosed here. Some contacts can also be made using conventional processes when such contacts are made in layers that do not require the processes disclosed here. The mask 310 also has an opening 330 that defines a location for deposition of a second element of the transducer (not shown in FIG. 7).

In FIG. 8, the mask 310 has been removed, an electrically conductive magnetic layer has been deposited, a backfill layer 340 is added, and the exposed topmost surface is planarized, producing coplanar surfaces of multiple layers. A planarized surface of the electrically conductive magnetic layer is exposed and comprises a sidewall 342, a cap 344, and a second element of the transducer 346. The sidewall 342, the cap 344 and the second element of the transducer 346 have mutually coplanar surfaces that are planarized. The backfill layer 340 is also planarized and coplanar with the sidewall 342, the cap 344 and the second element of the transducer 346. It is understood by those skilled in the art that there are small differences in erosion rates for differing materials during the planarization process, and that extremely small elevations differences can occur for different materials. The planarization produces coplanar surfaces within the limits of the planarization process used. The sidewall 342 provides an electrical feedthrough (also called a via) without the need for deposition of separate layers for the feedthrough. The feedthrough is accomplishing using the electrically conductive magnetic layer that is needed for the transducer. The cap 344 is a preferred feature, but not required to complete the feedthrough function. The transducer illustrated in FIGS. 7-8 is thus generally made according to the process steps described above in connection with FIGS. 2-6.

Figure 9:
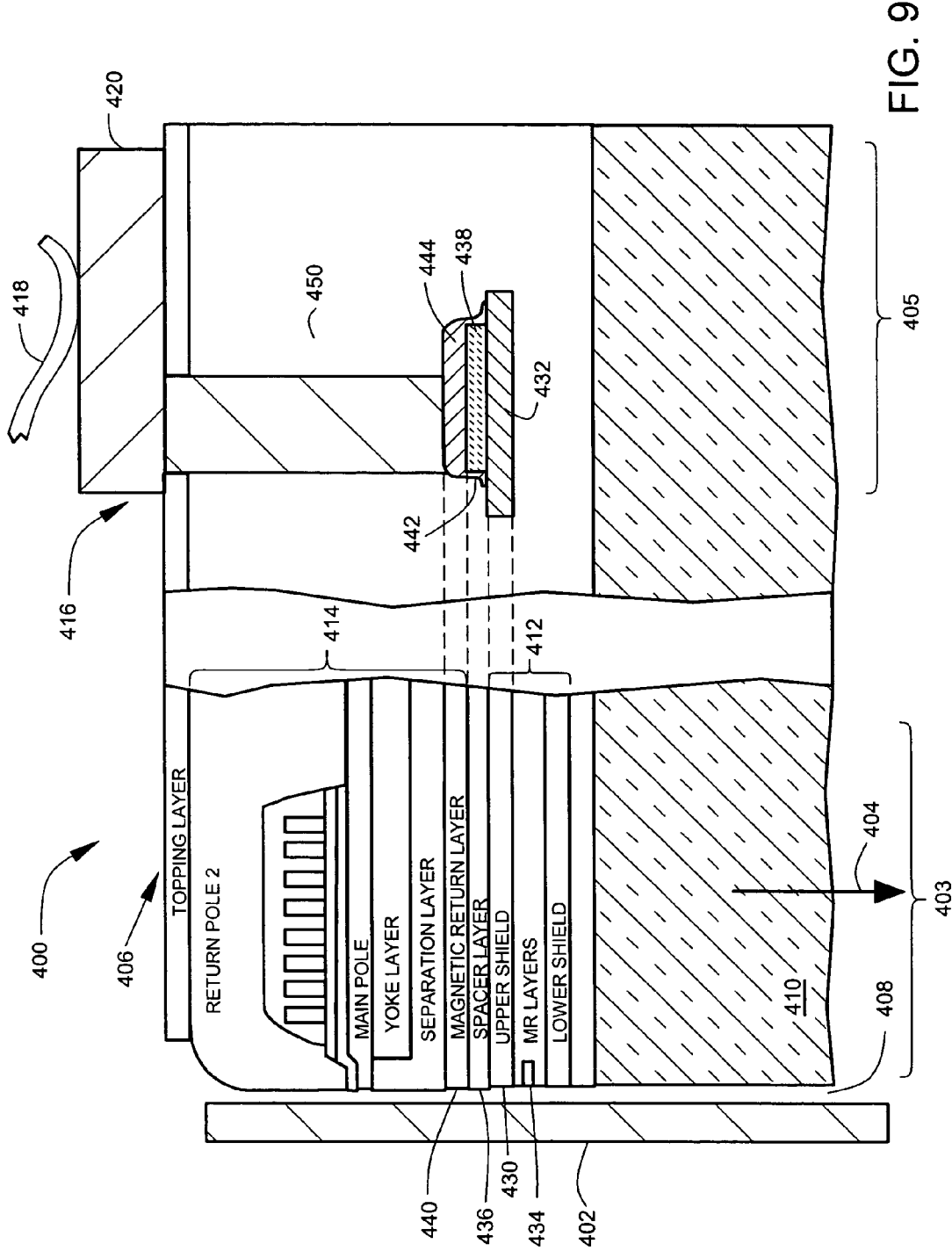
Figure 11:
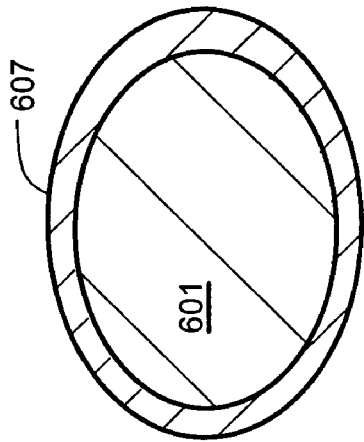
Figure 10:
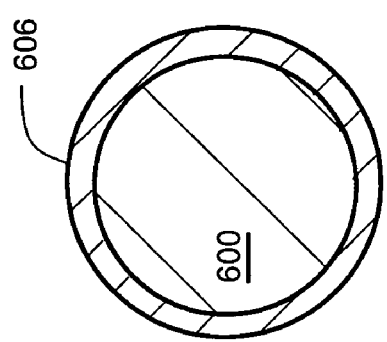
Figure 14:
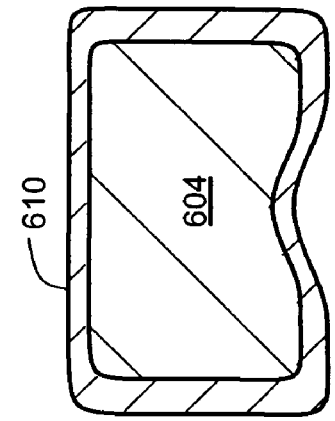
Figure 13:
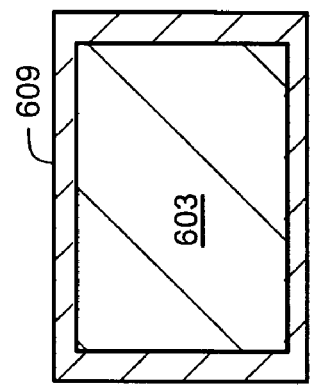
Figure 12:
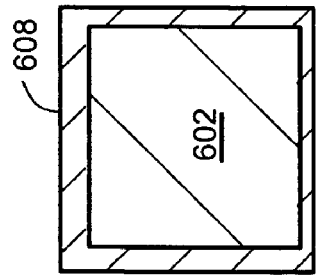

FIG. 9 illustrates a transducer 400 that comprises a perpendicular read/write head that transduces data stored on a disc 402 in a perpendicular recording format. The head 400 moves in a direction 404 relative to the disc 402. The transducer 400 includes a transducer region 403 and a contact region 405. The head 400 has a trailing side 406. The head 400 is separated from the disc 402 by an air bearing layer 408. The head 400 comprises multiple layers that are deposited in desired patterns on a substrate 410 to form functional components of a read transducer 412, a write transducer 414 and multiple electrical connections to electronic circuitry external to the head 400. Only one such electrical connection 416 is visible in the cross-section illustrated in FIG. 9. A lead 418 from an external electronic circuit is ultrasonically bonded to a contact pad 420. The substrate 410 typically comprises AlTiC.

The read transducer 412 includes an upper shield 430 that is a lithographically patterned first portion of a conductive layer (comparable to layer 202 in FIG. 2). The conductive layer also includes a lithographically patterned contact portion 432 that includes a trace (comparable to trace 322 of FIG. 7) that is an electrical transducer lead, typically a lead for a magnetoresistive sensor 434. An insulating layer (comparable to layer 214 in FIG. 2) is deposited on the conductive layer 202 and is lithographically patterned to include a spacer layer 436 in the transducer region 403, and a core 438 in a contact region 405.

The write transducer 414 includes a magnetic return layer 440 that is a lithographically patterned portion of an electrically conductive magnetic layer. The electrically conductive magnetic layer also includes a lithographically patterned sidewall 442 and cap 444. A top (distal) surface of the electrically conductive magnetic layer is planarized (along with a backfill layer) to form a planar surface for deposition of subsequent layers of the write transducer 414. A metal deposit 450 electrically connects the sidewall 442 to the external contact pad 420. Additional contacts can be provide for magnetoresistive read transducer traces, write transducer traces, electrical lap guide (ELG) traces or other transducer traces.

FIGS. 10-14 illustrate exemplary cores 600-604 and cylindrical sidewalls 606-610. The sidewalls 606-610 can conform to a cylinder 606 that is round, a cylinder 607 that is oval, a cylinder 608 that is square, a cylinder 609 that is rectangular, or a cylinder 610 with an irregular path. The term cylinder refers to a surface generated by a line which moves parallel to a fixed line so as to cut a fixed plane curve to define a cylinder along the line which moves.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the transducer while maintaining substantially the same functionality without departing from the scope and spirit of the present invention. In addition, although a preferred embodiment described herein is directed to a read/write head for disc drive, it will be appreciated by those skilled in the art that the teachings of the present invention can be applied to other transducers that include magnetic functions, without departing from the scope and spirit of the present invention.

What is claimed is:

1. A transducer, comprising:
    a first layer that comprises a support core that is electrically insulating and that has an outwardly facing support core sidewall that extends to a support core top surface, the support core being disposed in a contact region, and the first layer further comprising a first element of the transducer that is electrically insulating and that is disposed in a transducer region, the first element non-contiguous with the support core; and
    an electrically conductive magnetic deposit that comprises a first magnetic deposit portion that forms a closed path that surrounds the support core sidewall and that extends over the support core top surface, and the electrically conductive magnetic deposit further comprising a second element of the transducer disposed on the first element of the transducer.

2. The transducer of claim 1 wherein the first layer comprises a material selected from the group of silicon carbide, alumina, silicon dioxide, silicon nitride.

3. The transducer of claim 1 wherein the first magnetic deposit portion is contiguous over the support core sidewall and the support core top surface to form an electrical conduction path leading around the support core.

4. The transducer of claim 1 wherein the first element of the transducer comprises a spacer layer in a magnetic transducer.

5. The transducer of claim 1 wherein the second element of the transducer comprises a magnetic return layer in a magnetic transducer.

6. The transducer of claim 1 wherein the first magnetic deposit portion conducts a transducer signal.

7. The transducer of claim 1 wherein the support core sidewall comprises a round cylinder shape.

8. The transducer of claim 1 wherein the support core sidewall comprises an oval cylinder shape.

9. The transducer of claim 1 wherein the support core sidewall comprises a square cylinder shape.

10. The transducer of claim 1 wherein the support core sidewall comprises a rectangular cylinder shape.

11. The transducer of claim 1 wherein the support core sidewall comprises a cylinder shape along an irregular path.

12. The transducer of claim 1, further comprising a backfill layer disposed adjacent the closed path.

13. the transducer of claim 12, wherein the backfill layer is adjacent a side of the first element of the transducer.

14. The transducer of claim 1 wherein the first magnetic deposit portion is not contiguous with the second element of the transducer.

15. The transducer of claim 1 wherein the electrically conductive magnetic deposit comprises a seed layer.

16. A transducer, comprising:
    a conductive layer deposited over a substrate, the conductive layer including a first conductive layer portion in a transducer region, and a contact portion in a contact region, the contact portion non-contiguous with the first conductive layer portion to provide electrical isolation;
    a first layer comprising a support core that is electrically insulating and that has an outwardly facing support core sidewall with a cylinder shape that extends to a support core top surface, the support core disposed in the contact region, and the first layer further comprising a first element of the transducer that is electrically insulating and that is disposed in the transducer region; and an electrically conductive magnetic deposit comprising a first magnetic deposit portion that forms a closed path that surrounds the support core sidewall and extends over the support core top surface, and the electrically conductive magnetic deposit further comprising a second element of the transducer disposed on the first element of the transducer, the electrically conductive magnetic deposit providing an electrically conductive path to the conductive layer.

17. The transducer of claim 16 wherein the first magnetic deposit portion is contiguous over the support core sidewall and the support core top surface to form an electrical conduction path that passes through the first layer to form an electrical via through the first layer.

18. The transducer of claim 16 wherein the cylinder shape comprises a round sidewall.

19. The transducer of claim 16 wherein the cylinder shape comprises a non-round shape.

20. The transducer of claim 16, further comprising a backfill layer disposed adjacent the support core sidewall.

* * * * *